United States Patent
Tseng et al.

(10) Patent No.: US 9,425,967 B2
(45) Date of Patent: Aug. 23, 2016

(54) METHOD FOR CERTIFICATE GENERATION AND REVOCATION WITH PRIVACY PRESERVATION

(71) Applicant: INDUSTRIAL TECHNOLOGY RESEARCH INSTITUTE, Chutung, Hsinchu (TW)

(72) Inventors: Huei-Ru Tseng, New Taipei (TW); Pei-Chuan Tsai, Hsinchu County (TW); Rong-Hong Jan, Hsinchu (TW); Chien Chen, Hsinchu County (TW); Hsia-Hsin Li, Hsinchu (TW); Chih-Che Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 555 days.

(21) Appl. No.: 13/847,562

(22) Filed: Mar. 20, 2013

(65) Prior Publication Data
US 2014/0289512 A1 Sep. 25, 2014

(51) Int. Cl.
*H04L 29/06* (2006.01)
*H04L 9/32* (2006.01)

(52) U.S. Cl.
CPC ............ *H04L 9/3265* (2013.01); *H04L 9/3268* (2013.01)

(58) Field of Classification Search
CPC .... H04L 9/3265; H04L 9/3268; H04L 9/3263
See application file for complete search history.

(56) References Cited

U.S. PATENT DOCUMENTS

| | | | | |
|---|---|---|---|---|
| 4,309,569 A | * | 1/1982 | Merkle | H04L 9/3236 340/5.8 |
| 6,301,659 B1 | * | 10/2001 | Micali | G06Q 20/02 713/157 |
| 6,397,329 B1 | * | 5/2002 | Aiello | H04L 9/3268 713/155 |

(Continued)

FOREIGN PATENT DOCUMENTS

| | | |
|---|---|---|
| EP | 0 807 911 A2 | 11/1997 |
| TW | 200805982 A | 1/2008 |
| TW | 201141173 A1 | 11/2011 |

OTHER PUBLICATIONS

Office Action for German Applicatin No. 10 2013 109 513.5 dated May 11, 2015.

(Continued)

*Primary Examiner* — Brandon Hoffman
*Assistant Examiner* — Thong Truong
(74) *Attorney, Agent, or Firm* — Alston & Bird LLP

(57) ABSTRACT

Embodiments of the present invention are directed to methods and systems for generating and revoking, as well as validating, certificates used to protect communications within networks while maintaining privacy protection. In the context of a method, certificate generation and revocation with privacy preservation comprises determining a secret value to be used by a certificate authority and an entity; constructing a key tree based on the secret value, wherein the leaves of the key tree represent derived keys for the certificates for the entity; and generating certificates for the entity based in part on the key tree leaves. The method further comprises determining that one or more of the certificates should be revoked; determining a minimum key node set that covers the certificates to be revoked; adding the minimum key node set to a certificate revocation list; and providing the certificate revocation list to one or more entities. Corresponding apparatuses and computer program products are also provided.

42 Claims, 7 Drawing Sheets

(56) References Cited

U.S. PATENT DOCUMENTS

| | | | | |
|---|---|---|---|---|
| 6,735,313 | B1* | 5/2004 | Bleichenbacher | H04H 60/23 348/E7.056 |
| 6,883,100 | B1* | 4/2005 | Elley | G06F 21/629 726/5 |
| 7,007,040 | B1* | 2/2006 | Duke | H04L 12/185 |
| 7,315,941 | B2 | 1/2008 | Ramzan et al. | |
| 7,734,050 | B2* | 6/2010 | Tengler | H04L 9/3263 380/264 |
| 8,074,073 | B2* | 12/2011 | Gentry | H04L 9/0836 380/286 |
| 8,171,283 | B2 | 5/2012 | Pietrowicz et al. | |
| 8,230,215 | B2 | 7/2012 | Laberteaux et al. | |
| 8,386,800 | B2 | 2/2013 | Kocher et al. | |
| 8,819,418 | B2* | 8/2014 | Ando | H04L 9/3268 713/156 |
| 2002/0147906 | A1* | 10/2002 | Lotspiech | H04L 12/18 713/158 |
| 2003/0044017 | A1* | 3/2003 | Briscoe | H04L 9/0836 380/277 |
| 2003/0177352 | A1* | 9/2003 | Camenisch | H04L 9/3255 713/158 |
| 2003/0217265 | A1* | 11/2003 | Nakano | G11B 20/00086 713/158 |
| 2005/0220304 | A1* | 10/2005 | Lenoir | G06F 21/445 380/255 |
| 2006/0242699 | A1* | 10/2006 | Ramzan | G06F 21/33 726/21 |
| 2007/0174609 | A1* | 7/2007 | Han | G06F 21/10 713/167 |
| 2007/0185814 | A1 | 8/2007 | Boccon-Gibod et al. | |
| 2009/0235071 | A1* | 9/2009 | Bellur | H04L 9/3268 713/158 |
| 2009/0259841 | A1* | 10/2009 | Laberteaux | H04L 9/3268 713/156 |

OTHER PUBLICATIONS

Revocation List [online] [retrieved May 11, 2015]. Retrieved from the Internet: <URL: http://en.wikipedia.org/w/index.php?title=Revocation_list&oldid=540690049>. (dated Feb. 26, 2013) 3 pages.

Crepeau, C., et al.; "A Certificate revocation Scheme for Wireless Ad Hoc Networks;" Proceedings of the 1$^{st}$ ACM Workshop Security of Ad Hoc and Sensor Networks; pp. 54-61; dated 2003.

ETSI TR 102 893 V1.1.1; "Intelligent Transport Systems (ITS); Security; Threat, Vulnerability and Risk Analysis (TVRA);" pp. 1-86; dated Mar. 2010.

Haas, J. J., et al.; "Design and Analysis of a Lightweight Certificate Revocation Mechanism for VANET;" VANET '09; pp. 89-98; dated Sep. 25, 2009.

Laberteaux, K. P., et al.; Security Certificate Revocation List Distribution for VANET; VANET '08; pp. 88-89; dated Sep. 15, 2008.

Lu, R., et al.; "ECPP: Efficient Conditional Privacy Preservation Protocol for Secure Vehicular Communications;" IEEE Communications Society, IEEE INFOCOM 2008 Proceedings; pp. 1903-1911; dated 2008.

Papadimitratos, P., et al.; "Certificate Revocation List Distribution in Vehicular Communication Systems;" VANET '08; pp. 86-87; dated Sep. 15, 2008.

Struder, A., et al.; "TACKing Together Efficient Authentication, Revocation, and Privacy in VANETs;" IEEE Communications Society, IEEE Secon; dated 2009.

Office Action for Taiwanese Application No. 10219191 dated Dec. 25, 2014.

* cited by examiner

METHOD FOR CERTIFICATE GENERATION AND REVOCATION WITH PRIVACY PRESERVATION

TECHNICAL FIELD

Embodiments of the present disclosure generally relate to communication systems, and to methods and systems for generating and revoking certificates used to protect communications within networks.

With the expansion of the use of networks to provide communications between devices, methods have been developed to ensure authenticity and trustworthiness of messages transmitted between devices over networks.

BACKGROUND

One such solution is a public key cryptosystem. In public key cryptosystems, entities may use certificates provided by a certificate authority to ensure that messages are authentic. A certificate authority may provide an entity with a certificate identifying the entity that the entity may attach to messages to provide authentication to another entity receiving the message. Such certificates provide signature generation and verification, such as by using encryption.

In some situations, a certificate authority may need to revoke a certificate before it expires, such as when an entity's private key is compromised, when an entity device is malfunctioning, or when an entity's access is revoked. To do this, a certificate authority manages a certificate revocation list (CRL) that contains the values for the revoked certificates that it may then provide to the entities to verify the validity of received certificates.

In some networks, such as vehicular networks for example, a certificate authority may issue tens of thousands of certificates to an entity so that the entity can change the certificate in use on a frequent basis, such as to protect the privacy or identity of the entity.

In such networks, a certificate revocation list may have to list the tens of thousands of certificates issued to an entity if the certificates need to be revoked, causing the certificate revocation list to become unmanageably large and requiring significant processing burden to verify certificates.

BRIEF SUMMARY

Embodiments of the present invention relate to methods and systems for generating and revoking certificates used to protect communications and privacy within communication networks.

Methods, apparatuses and computer program products are therefore provided according to example embodiments of the present invention to perform certificate generation and revocation as well as to perform certificate validation in communication networks.

In one embodiment, a method is provided that at least includes determining that one or more certificates of an entity should be revoked; determining a minimum key node set that covers the certificates to be revoked; adding the minimum key node set to a certificate revocation list; and providing the certificate revocation list to one or more entities.

In some embodiments, the method may further comprise determining one or more subtrees of the key tree that have only leaves comprising the certificates to be revoked and adding a root node of each of the one or more subtrees to the minimum key node set.

In some embodiments, the certificates may comprise a derived secret key from a leaf node of the key tree, an index of the key tree leaf node, a public key for the entity, and a certificate authority signature.

In some embodiments, adding the minimum key node set to a certificate revocation list may further comprise adding a node index, a derived secret key corresponding to the node index, and a node level for each node within the minimum key node set to the certificate revocation list.

In some embodiments, the nodes of the key tree may be generated using one-way hash functions and the key value of the parent node.

In some embodiments, the certificate revocation list may be periodically provided to the entities.

In some embodiments, the certificates may be generated such that each of the certificates for the entity has no links to the other certificates for the entity and such that the certificates cannot be used to determine the actual identity of the entity.

In some embodiments, the method may further comprise determining a secret value to be used by a certificate authority and an entity; constructing a key tree based on the secret value, wherein the leaves of the key tree represent derived keys for the certificates for the entity; generating certificates for the entity based in part on the key tree leaves; and causing the certificates to be provided to the entity.

In another embodiment, a method is provided that at least includes receiving a certificate revocation list from a certificate authority; receiving a message from a first entity comprising a certificate and other data; determining node index values for a certificate; and searching the certificate revocation list for the node index values. The method further comprises indicating the certificate is valid and accepting the message if the node index values are not found on the certificate revocation; and if one or more of the index values are found on the certificate revocation list, determining a path through a key tree to a node identified by the node index value, computing a new secret key using the path and the derived secret key of the identified node, comparing the computed new secret key to a secret key of the certificate, and if the keys match, indicating the certificate is revoked and disregarding the message.

In some embodiments, the certificate revocation list comprises one or more records, where the one or more records each comprise a node index of a key tree node, a derived secret key corresponding to the node index, and a tree level corresponding to the node index.

In some embodiments, the method may further comprise verifying the certificate with a sender's public key, retrieving a node index from the certificate, and determining indexes of one or more nodes in a path from the certificate to a root node.

In one embodiment, a method is provided that at least includes determining a secret value to be used by a certificate authority and an entity; constructing a key tree based on the secret value, wherein the leaves of the key tree represent derived keys for the certificates for the entity; and generating certificates for the entity based in part on the key tree leaves. The method also comprises determining that one or more of the certificates should be revoked; determining a minimum key node set that covers the certificates to be revoked; adding the minimum key node set to a certificate revocation list; and providing the certificate revocation list to one or more entities.

In another embodiment, a computer-readable storage medium is provided comprising computer program instructions stored therein, the computer program instructions, when executed on a computer, configured to at least receive a certificate revocation list from a certificate authority; receive a message from a first entity comprising a certificate and other data; determine node index values for a certificate; and search the certificate revocation list for the node index values. The computer program instructions further configured to indicate the certificate is valid and accept the message if the node index values are not found on the certificate revocation; and if one or more of the index values are found on the certificate revocation list, determine a path through a key tree to a node identified by the node index value, compute a new secret key using the path and the derived secret key of the identified node, compare the computed new secret key to a secret key of the certificate, and if the keys match, indicate the certificate is revoked and disregard the message.

In another embodiment, an apparatus is provided comprising at least one processor, and at least one memory including computer program instructions, the memory and computer program instructions being configured to, in cooperation with the processor, cause the apparatus to at least receive a certificate revocation list from a certificate authority; receive a message from a first entity comprising a certificate and other data; determine node index values for a certificate; and search the certificate revocation list for the node index values. The apparatus further configured to indicate the certificate is valid and accept the message if the node index values are not found on the certificate revocation; and if one or more of the index values are found on the certificate revocation list, determine a path through a key tree to a node identified by the node index value, compute a new secret key using the path and the derived secret key of the identified node, compare the computed new secret key to a secret key of the certificate, and if the keys match, indicate the certificate is revoked and disregard the message.

In another embodiment, an apparatus is provided comprising at least means for receiving a certificate revocation list from a certificate authority; means for receiving a message from a first entity comprising a certificate and other data; means for determining node index values for a certificate; and means for searching the certificate revocation list for the node index values. The apparatus further comprising means for indicating the certificate is valid and means for accepting the message if the node index values are not found on the certificate revocation; and if one or more of the index values are found on the certificate revocation list, means for determining a path through a key tree to a node identified by the node index value, means for computing a new secret key using the path and the derived secret key of the identified node, means for comparing the computed new secret key to a secret key of the certificate, and if the keys match, means for indicating the certificate is revoked and disregarding the message.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

Figure 1:
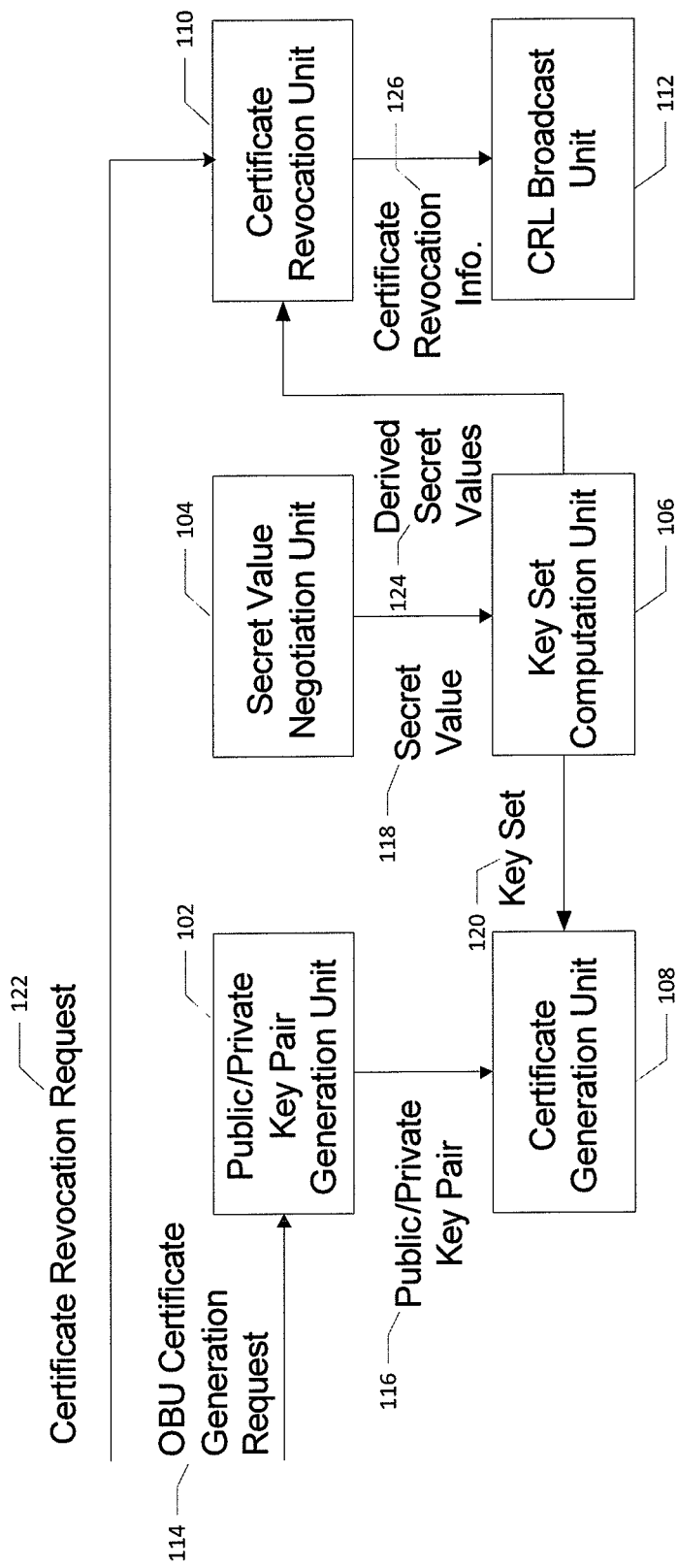
Figure 2:
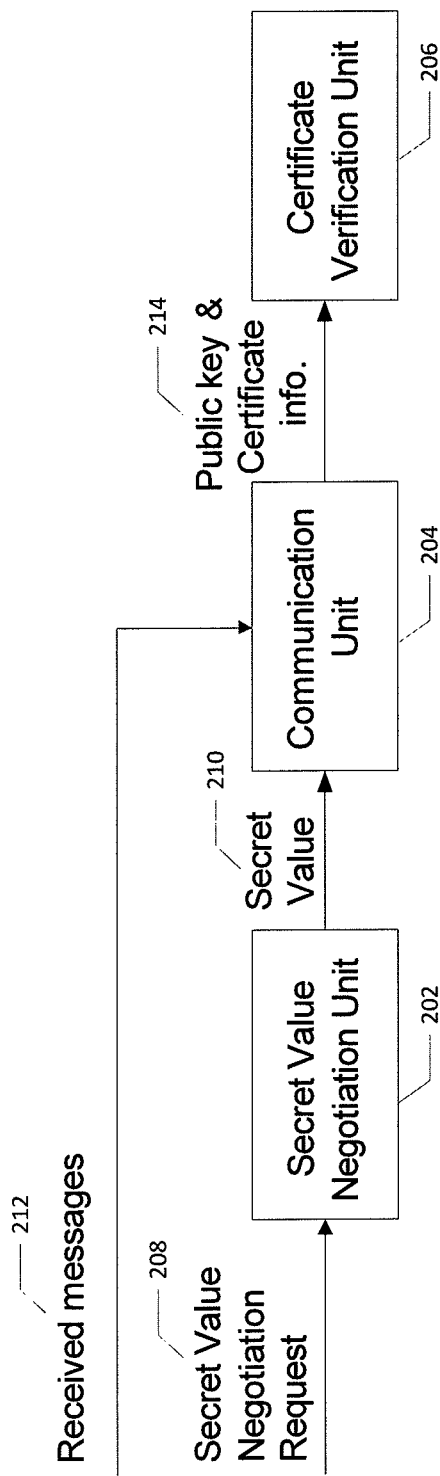
Figure 3:
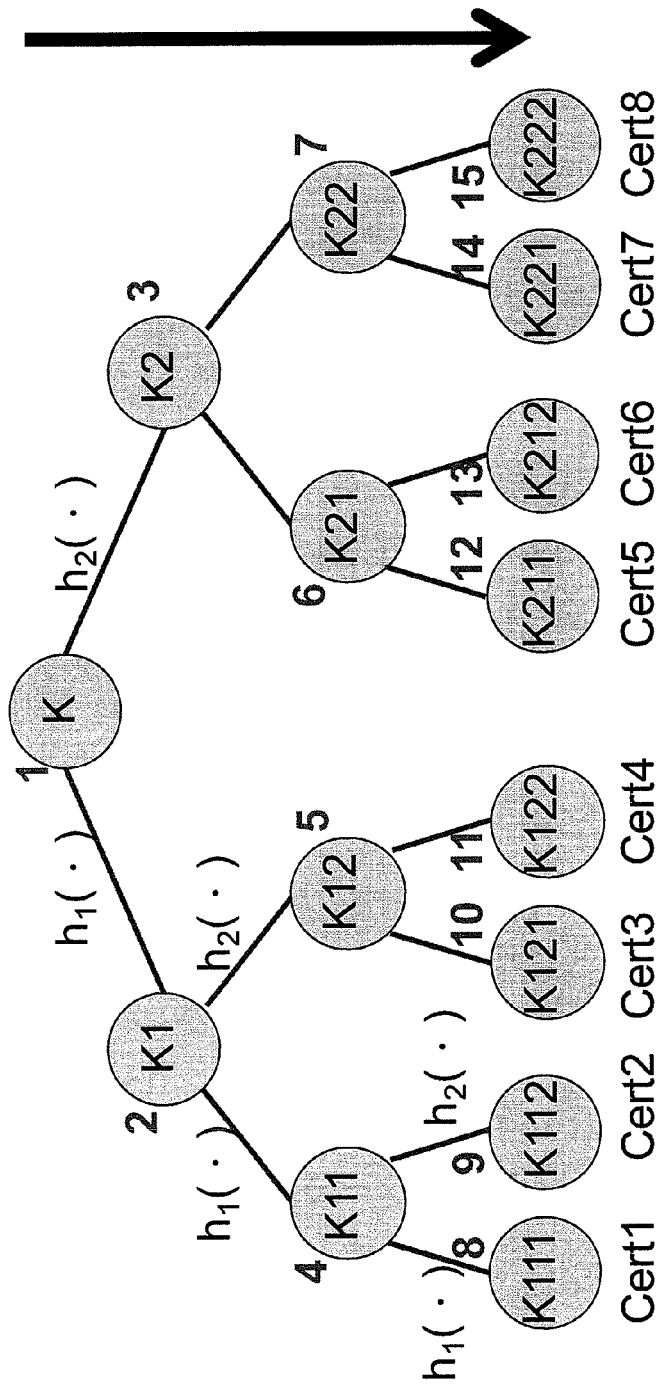
Figure 5:
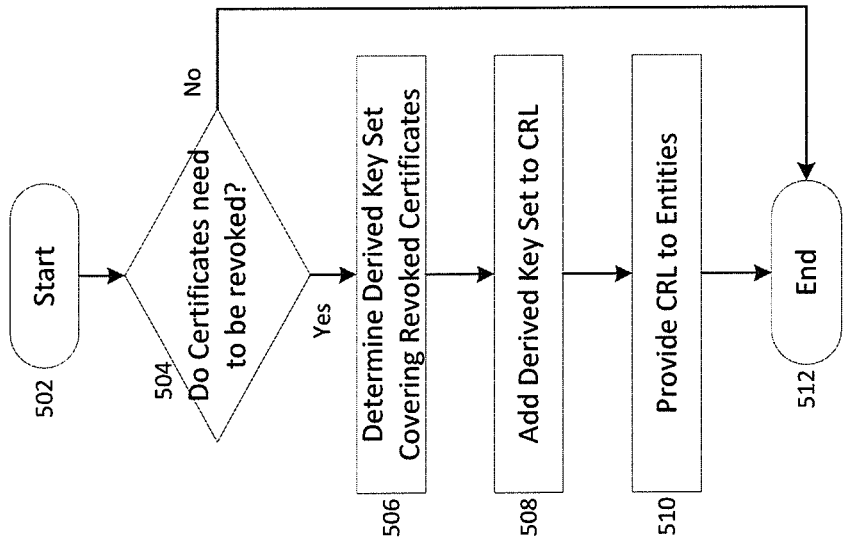
Figure 4:
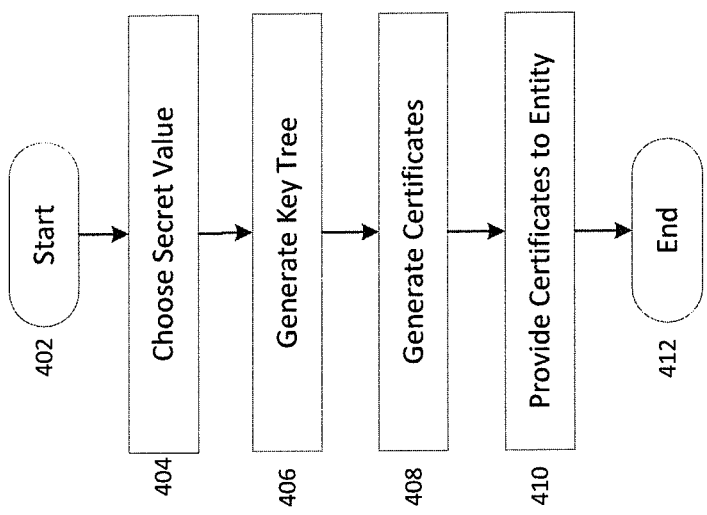
Figure 6:
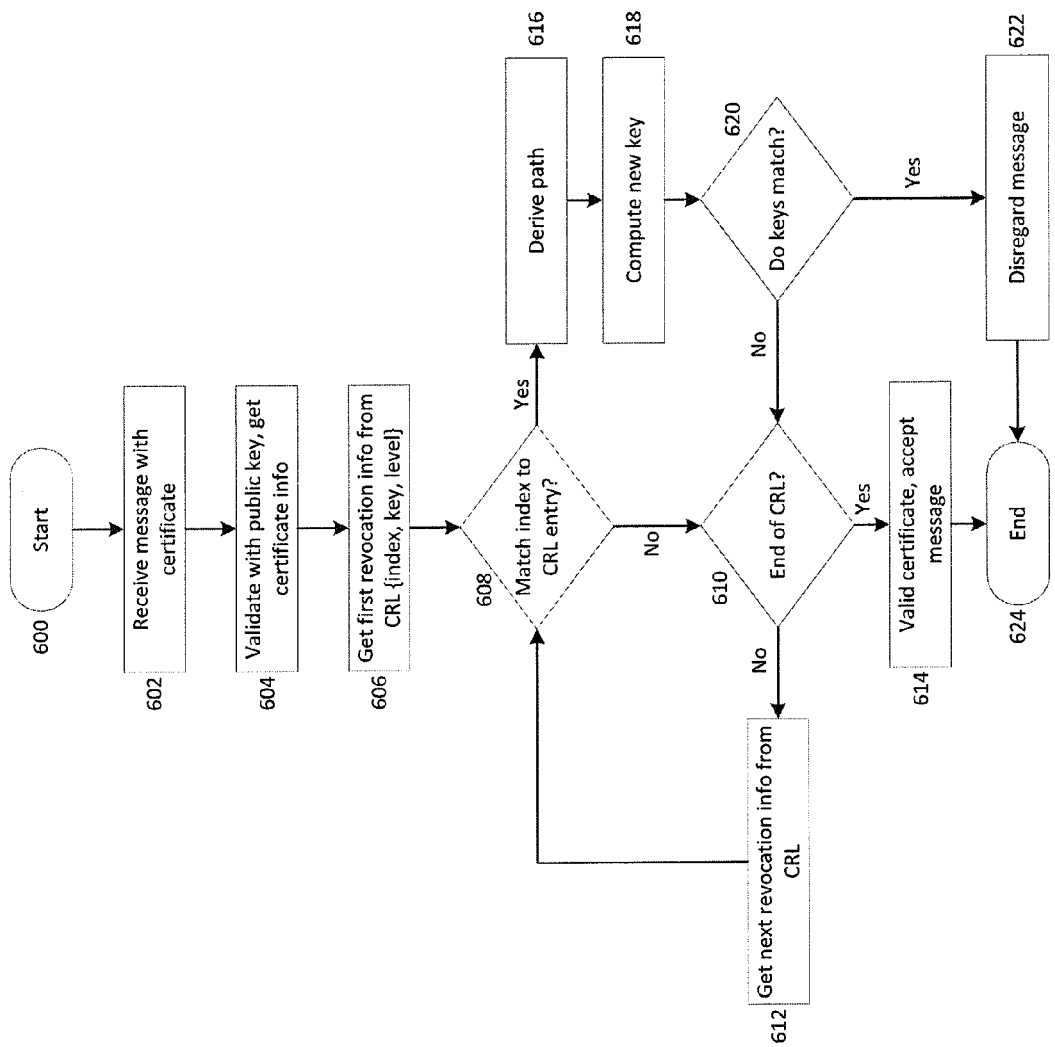
Figure 7:
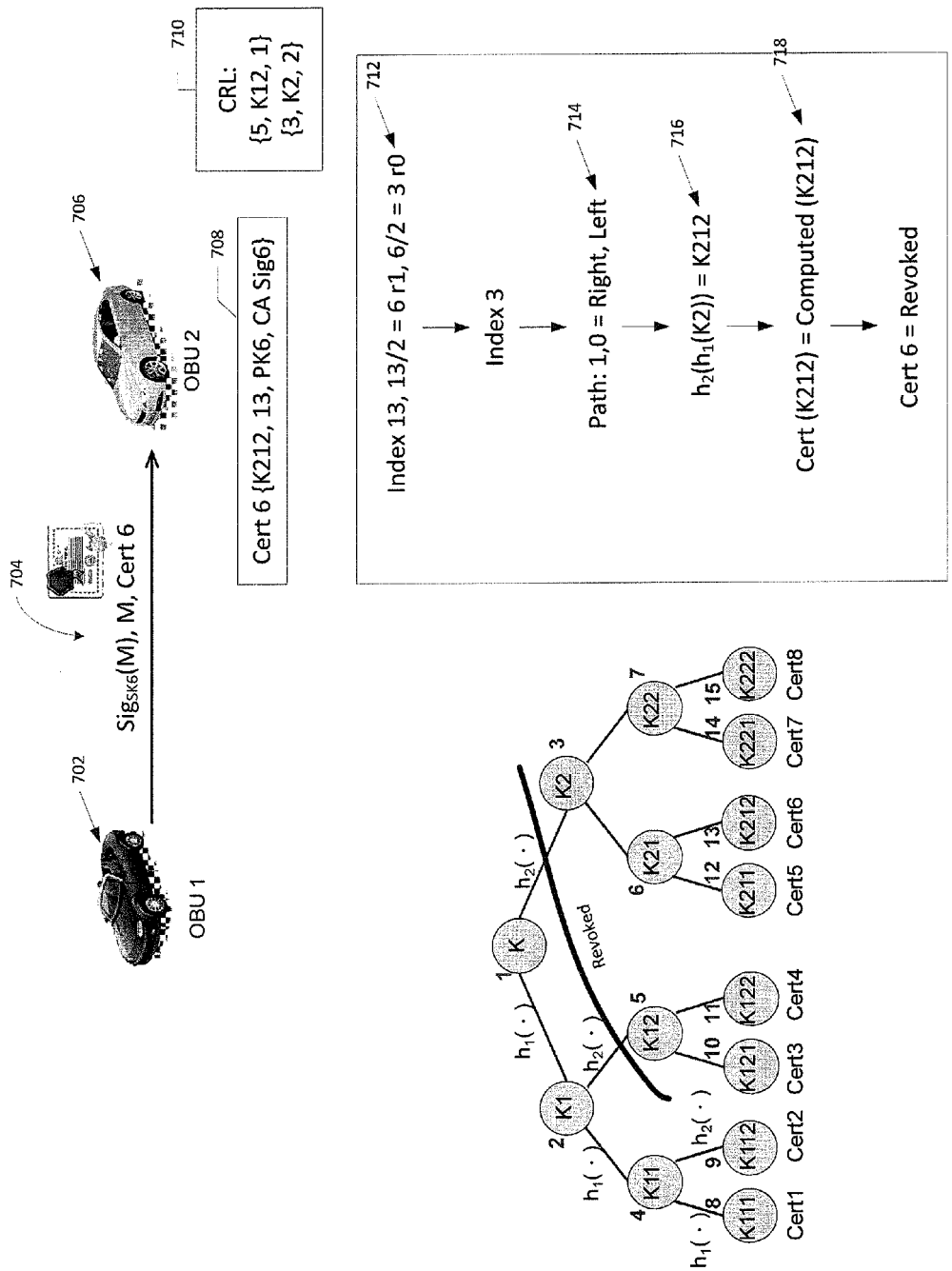
Figure 8:
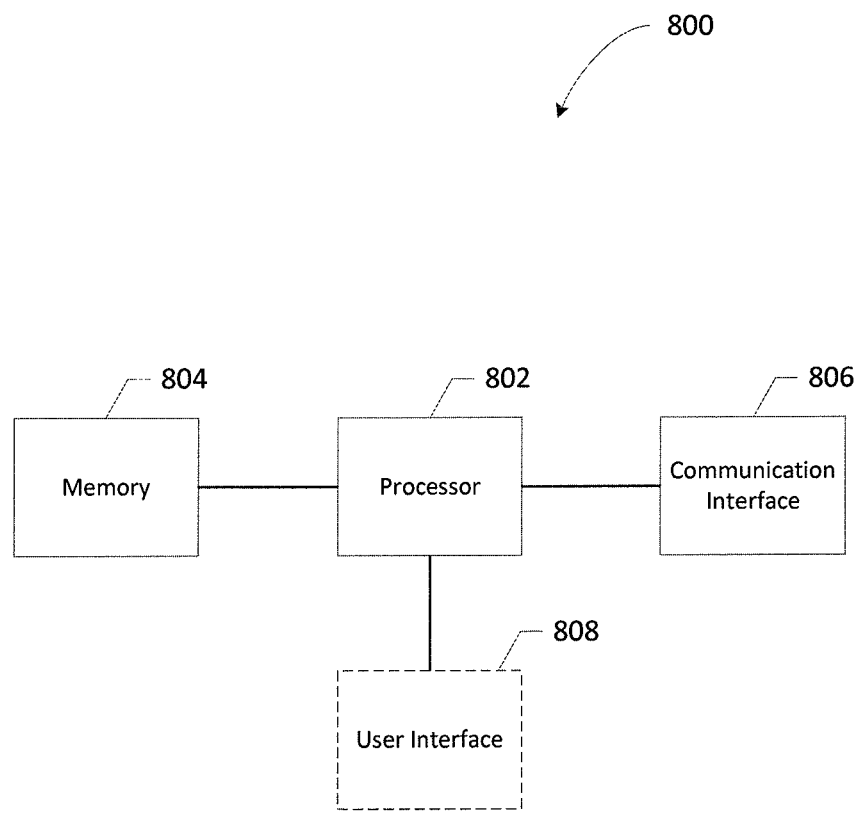

Having thus described certain embodiments of the invention in general terms, reference will now be made to the accompanying drawings, which are not necessarily drawn to scale, and wherein:

FIG. 1 is a block diagram illustrating the certificate authority (CA) certificate generation and revocation in one or more apparatuses with various modules according to some example embodiments of the present invention;

FIG. 2 is an exemplary block diagram illustrating the entity certificate verification in one or more apparatuses with various modules according to some example embodiments of the present invention;

FIG. 3 illustrates a key tree used in certificate generation and revocation according to some example embodiments of the present invention;

FIG. 4 illustrates a flow chart of example operations that may be used in certificate generation according to some example embodiments of the present invention;

FIG. 5 illustrates a flow chart of example operations that may be used in certificate revocation according to some example embodiments of the present invention;

FIG. 6 illustrates a flow chart of example operations that may be used in certificate verification according to some example embodiments of the present invention;

FIG. 7 illustrates a schematic overview of operations for certificate verification according to some example embodiments of the present invention; and FIG. 8 illustrates a block diagram of an apparatus that may be configured to perform operations according to some example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Embodiments of the present invention are directed to methods and systems for generating and revoking certificates to be used by devices for ensuring the authenticity and trustworthiness of messages in a communication network.

In public key cryptosystems, entities may use certificates provided by a certificate authority (CA) to ensure that messages are authentic and senders are trustworthy. A CA may provide an entity with one or more certificates identifying the entity that the entity may attach to messages to provide authentication to another entity receiving the message.

In such systems, a CA and an entity may agree on a secret key value that may be used in the generation of the certificates. The CA may generate a series of public/private key pairs for the entity and generate certificates using the public/private key pairs, which it then provides to the entity for use in network communications.

When a CA needs to revoke a certificate prior to the expiration of the certificate, such as when an entity's private key is compromised, an entity malfunctions, or access is revoked for an entity, the CA may add the certificate information to a certificate revocation list (CRL) that is provided to all the entities in the network. The entities may use the CRL to verify the validity of a certificate it receives along with a message.

In some systems, a CA may issue a very large number of certificates (e.g. tens of thousands of certificates) to each entity to allow the entity to frequently change the certificate in use, such as to provide improved security and privacy protection for the entities.

In some examples, when a CA revokes certificates in use, it must add the certificate hash value for each certificate, along with other associated data, to the CRL. As such, in systems where each entity has very large numbers of certificates, the CRL becomes inefficient as it rapidly increases in size and requires increasingly more processing resources to verify certificate validity.

In another example, when a CA revokes certificates in use, it adds the secret value used for generation of the entity's certificates, along with other data, to the CRL. In such systems, when the CA adds the secret value to the CRL it discloses all the entity's certificates and may also compromise the privacy of the entity.

One example of such a communication network is an Intelligent Transportation System (ITS). An ITS provides monitoring and management of a transportation system to more effectively use the limited resources and reduce congestion, delays, and costs. In an ITS, vehicles are equipped with an on-board unit (OBU) and wireless communication devices. The OBU may then communicate with nearby vehicles and road-side units (RSU) and participate in the ITS. In such networks, the OBUs and RSUs may use public key cryptosystems to ensure the authenticity and correctness of the messages being exchanged.

In such an ITS, a CA may issue tens of thousands of certificates to each OBU so that the OBU may frequently change the certificate in use, such as every ten minutes for example. Frequently changing the certificate in use for a vehicle may provide privacy protection for the actual identity of the vehicles participating in the ITS.

Embodiments of the present invention provide for generation, revocation, and validation of certificates that meet the needs for authentication and privacy, and reduce the resources required to maintain and validate certificate status.

FIG. 1 is an exemplary block diagram illustrating the certificate authority (CA) certificate generation and revocation in one or more apparatuses with various modules according to some example embodiments of the present invention. In some embodiments, the CA system may comprise one or more apparatuses with various modules that provide the functions of certificate generation and revocation. In some example embodiments, the CA modules may comprise a public/private key pair generation unit 102, a secret value negotiation unit 104, a key set computation unit 106, a certificate generation unit 108, a certificate revocation unit 110, and a CRL broadcast unit 112.

In some embodiments, the CA may receive a certificate generation request 114 from an entity. The public/private key pair generation unit 102 may then generate a number of public/private key pairs for the requesting entity and send the public/private key pairs 116 to the certificate generation unit 108.

The secret value negotiation unit 104 may determine an agreed-upon secret value 118, e.g. K, between the CA and the requesting entity. The secret value negotiation unit 104 may then send the secret value 118 to the key set computation unit 106. The key set computation unit 106 may then generate a derived key set by constructing a key tree, as subsequently described in regard to FIG. 3, with a root node of the secret value 118 ("K"). The key set computation unit 106 may then send the derived key set 120 to the certificate generation unit 108.

The certificate generation unit 108 may then use the public/private key pairs 116 and the derived key set 120 to generate the certificates for use by the requesting entity. In some example embodiments, a generated certificate may comprise a derived secret key from a leaf of the key tree, an index of the derived secret key, a public key for the entity, and a CA signature. The CA may then send the series of certificates to the requesting entity for use in securing and authenticating messages. In some example embodiments, the generated certificates are unrelated and not linked together and cannot be used to trace the actual identity of the entity.

The CA may, at some later time, determine a need to revoke one or more unexpired certificates previously generated for an entity. Additionally or alternatively, the CA may receive an indication that one or more of an entity's unexpired certificates should be revoked. The CA may then cause a certificate revocation request 122 to be generated and provided to certificate revocation unit 110. The certificate revocation unit 110 may determine the certificates that need to be revoked and, with the key set computation unit 106, determine a minimum set of derived keys, based on the key tree, which will cover all the revoked certificates. The certificate revocation unit 110 may then use the minimum set of derived keys 124 to update the certificate revocation list (CRL) by causing the derived keys 124 along with other associated data to be added to the CRL. In some example embodiments, the certificate revocation unit 110 may add an entry to the CRL for each of the identified derived keys comprising an index of the derived key (e.g. the index of the node containing the derived key), the derived key value, and the level of the derived key in the key tree.

The certificate revocation unit 110 may then provide the updated CRL 126 to the CRL broadcast unit 112 which may then cause the CRL to be periodically transmitted to one or more entities within the network. The entities may then use the CRL in determining whether received certificates are valid or revoked.

FIG. 2 is an exemplary block diagram illustrating the entity certificate verification in one or more apparatuses with various modules according to some example embodiments of the present invention. In some embodiments the entity may comprise one or more apparatuses with various modules that provide the functions of certificate verification. In some example embodiments, the entity modules may comprise at least a secret value negotiation unit 202, a communication unit 204, and a certificate verification unit 206.

The secret value negotiation unit 202 may receive a secret value negotiation request 208 as part of the operations of requesting certificates from a CA, such as described in regard to FIG. 1. The secret value negotiation unit 202 may determine a secret value, e.g. K, and provide the secret value 210 to the communication unit 204 to cause transmission of the secret value to the CA for use in certificate generation. The entity may transmit and receive various network communications through the communication unit 204, such as receiving generated certificates from the CA, receiving the CRL from the CA, as well as transmitting and receiving messages to and from other entities in the network.

The communication unit 204 may periodically receive the CRL from the CA and send it to the certificate verification unit 206 for use in certificate verification of received messages.

The communication unit 204 may receive messages from other entities in the network. The received messages 212 may comprise message data, a message signature (e.g. signature of the sending entity generated using its private key), and a certificate from the sending entity. The communication unit 204 may send the received certificate information 214 to the certificate verification unit 206 to determine if the received certificate is valid or revoked.

The certificate verification unit 206 may calculate and compare information derived from the certificate and the CRL to determine if the certificate has been revoked. If the certificate verification unit 206 determines that the certificate has been revoked, it may provide an indication that the message should be disregarded.

FIG. 3 illustrates a key tree used in certificate generation and revocation according to some example embodiments of the present invention. In some example embodiments, a CA and an entity may agree upon a secret value, K, for use in generating certificates for the entity. The CA may then perform operations to construct a key tree whose root comprises the secret value K. The CA may then use the derived secret values of the key tree leaves in the generation of the certificates.

In an example embodiment, the CA may construct a binary key tree by using two one-way hash functions to generate the children of each parent node. For example, the CA may generate left child nodes by applying a first one-way hash function to the value from the parent node and generate right child nodes by applying a second one-way hash function to the value from the parent node. Although the example embodiment describes a binary key tree using two one-way hash functions, other types of key trees may also be constructed using more one-way hash functions, such as a tertiary key tree using three one-way hash functions to generate the children nodes of each parent node, or an n-ary key tree using n one-way hash functions to generate the children nodes of each parent node.

As shown in FIG. 3, the CA constructs an example key tree for eight certificates starting from root node 1 using the secret value K. The CA may generate a left child node 2 by applying a first one-way hash function, $h_1()$ to the root value K to calculate derived value K1. The CA may generate a right child node 3 by applying a second one-way hash function, $h_2()$ to the root value K to calculate derived value K2.

The CA may generate a left child node 4 from node 2 by applying the first one-way hash function, $h_1()$ to the node 2 value, K1, to calculate derived value K11. The CA may generate a right child node 5 from node 2 by applying the second one-way hash function, $h_2()$ to the node 2 value K1 to calculate derived value K12.

The CA may generate a left child node 8 from node 4 by applying the first one-way hash function, $h_1()$ to the node 4 value, K11, to calculate derived value K111. The CA may generate a right child node 9 from node 4 by applying the second one-way hash function, $h_2()$ to the node 4 value K11 to calculate derived value K112.

The CA may generate a left child node 10 from node 5 by applying the first one-way hash function, $h_1()$ to the node 5 value, K12, to calculate derived value K121. The CA may generate a right child node 11 from node 5 by applying the second one-way hash function, $h_2()$ to the node 5 value K12 to calculate derived value K122.

The CA may generate a left child node 6 from node 3 by applying the first one-way hash function, $h_1()$ to the node 3 value K2 to calculate derived value K21. The CA may generate a right child node 7 from node 3 by applying the second one-way hash function, $h_2()$ to the node 3 value K2 to calculate derived value K22.

The CA may generate a left child node 12 from node 6 by applying the first one-way hash function, $h_1()$ to the node 6 value K21 to calculate derived value K211. The CA may generate a right child node 13 from node 6 by applying the second one-way hash function, $h_2()$ to the node 6 value K21 to calculate derived value K212.

The CA may generate a left child node 14 from node 7 by applying the first one-way hash function, $h_1()$ to the node 7 value K22 to calculate derived value K221. The CA may generate a right child node 15 from node 7 by applying the second one-way hash function, $h_2()$, to the node 7 value K22 to calculate derived value K222.

The CA may then use the derived values of the leaf nodes to generate the certificates. For example, the CA may use derived value K111 to generate the first certificate, Cert1; use the derived value K112 to generate the second certificate, Cert2; use derived value K121 to generate the third certificate, Cert3; use derived value K122 to generate the fourth certificate, Cert4; use derived value K211 to generate the fifth certificate, Cert5; use derived value K212 to generate the sixth certificate, Cert6; use derived value K221 to generate the seventh certificate, Cert7; and use derived value K222 to generate the eighth certificate, Cert8.

In the described example embodiment, the first certificate, Cert1, data may comprise the derived secret key K111, the node index 8, the entity public key 1, and the CA signature 1. As described in the example embodiments, it is difficult to derive the original secret value K from the certificate derived secret value.

FIG. 4 illustrates a flow chart of example operations that may be used in certificate generation according to some example embodiments of the present invention. A CA may perform certificate generation by starting operation, such as shown in block 402.

As shown at block 404, the CA may negotiate with an entity to determine a secret key value to be used for generation of a key tree and certificates for the entity. At block 406, the CA may then use the secret key to generate a key tree, such as the key tree described in regard to FIG. 3 above.

As shown at block 408, the CA may then use the key tree in generating certificates for the entity. For example, the CA may use the derived secret value of each of the leaves of the key tree, as well as the entity's public keys and the CA's private key, to generate the set of certificates for the entity. The CA may then provide the certificates to the entity, such as shown at block 410. The operation then continues to block 412 and ends.

FIG. 5 illustrates a flow chart of example operations that may be used in certificate revocation according to some example embodiments of the present invention. A CA may perform certificate revocation by starting operation, such as shown in block 502.

As shown at block 504, the CA may determine whether there are certificates that should be revoked. If there are no certificates to be revoked, the operation may continue to block 512 and end. If the CA determines that there are certificates to be revoked, the operation may continue to block 506.

As shown in block 506, the CA may determine which certificates are to be revoked and may determine a derived key set that covers the certificates that are to be revoked. For example, the CA may use the key tree to determine the minimum set of nodes that will cover all of the revoked certificates.

As shown in block 508, the CA may then add the derived key set and associated data to the CRL. The CA may then provide the updated CRL to the entities within the network, such as shown at block 510. The operation then continues to block 512 and ends.

In an example embodiment, using the key tree of FIG. 3, the CA may determine that certificates 3 through 8 should be revoked. The CA may determine that derived key K12 at node 5 covers certificates 3 and 4 and that derived key K2 at node 3 covers certificates 5 through 8.

The CA may then add the set of derived keys and the corresponding index and level to the CRL. For example, the CA may cause two entries to be added to the CRL; a first entry comprising index 5, derived key K12, and level 1 (indicating that the derived value is a depth or level of 1 up from the leaf node); and a second entry comprising index 3, derived value K2, and level 2. As such, in the example embodiment, the CA may only add two entries to the CRL to cover the eight revoked certificates, rather than adding entries for each of the eight certificates. The CA may then cause the CRL to be sent to the entities when the CRL is updated and may also cause the CRL to be sent to the entities on a periodic basis.

In some example embodiments, a first entity may cause a message to be sent to a second entity. When the second entity receives the message, the second entity may verify the validity of the first entities certificate included with the message data. In some embodiments, the second entity may verify the certificate validity by checking the index of the certificate and the parent indexes of the certificate against the CRL. The second entity may then derive the path for the certificate and compute a derived secret key based on the path and then compare the derived secret key to the CRL. If the second entity finds a match to the values on the CRL, the second entity may disregard the received message.

FIG. 6 illustrates a flow chart of example operations that may be used in certificate verification according to some example embodiments of the present invention. An entity may begin operations for certificate verification such as shown at block 600. As shown in block 602 an entity may receive a message with a certificate from another entity within the network.

As shown in block 604, the receiving entity may validate the sending entity's public key contained within the certificate and retrieve the information from the certificate for verification. In some embodiments, the receiving entity may retrieve the derived secret value and the index from the received certificate.

In some embodiments, the receiving entity may use the certificate index to determine a set of key tree node indexes related to the certificate, e.g. the indexes of in a path from the certificate node to the root node. For example, if the receiving entity receives Cert2 having index 9, as described in FIG. 3, the receiving entity may determine the node indexes by dividing the certificate index by the dimension of the key tree, e.g. by dividing by 2 for a binary tree. For example, the receiving entity may calculate 9/2=4, with a remainder of 1, and 4/2=2, with a remainder of 0, providing indexes of 4 and 2.

As shown in block 606 the receiving entity may then retrieve a first entry of certificate revocation information from the CRL. In some embodiments, the receiving entity may retrieve the first entry comprising an index, derived key, and level from the CRL. For example, the receiving entity may retrieve a first entry from the CRL comprising index 3, derived key K2, and level 2.

The receiving entity may then compare the index data from the certificate to the CRL, as shown in block 608. If the index data does not match the certificate revocation information from the CRL, the operation may continue to block 610.

As shown in block 610, the receiving entity may then determine if there are more entries in the CRL that should be compared. If there are additional entries on the CRL, operation continues to block 612 where the next certificate revocation information is retrieved from the CRL. Operation then returns to block 608. If there are no more entries on the CRL, operation continues to block 614.

For example, the receiving entity may compare the index values of 4 and 2 to the index of 3 from the CRL and since the indexes do not match the CRL index, the receiving entity may then check to see if there are more entries on the CRL and if so, repeat the comparison operation.

As shown in block 614, if the certificate does not match any entry on the CRL, the certificate may be indicated as valid and the receiving entity may accept the message. Operation may then continue to block 624 and end.

At block 608, if the index data does match the certificate revocation information from the CRL, the operation may continue to block 616.

For example, if the receiving entity received Cert5 having index 12 and derived key K211, as described in FIG. 3, the receiving entity may determine the indexes as 6 and 3 (e.g. 12/2=6, remainder 0 and 6/2=3, remainder 0) with the index 3 matching the CRL entry index of 3.

As shown in block 616, the receiving entity may compute the path for the matched index. The receiving entity may then compute a new derived key using the path and the matched index, as shown in block 618.

In some embodiments, the receiving entity may use the remainder values from the index calculations to determine the path from the bottom of the key tree. For example, using Cert5, the remainders are 0 and 0 so the path up the tree would be left then left (i.e. remainder 0 equals a left branch, remainder 1 equals a right branch). The receiving entity may then use the path and the derived secret key of K2 to compute a new key. For example, if the left branches use the $h_1(\ )$ one-way hash function and the right branches use the $h_2(\ )$ one-way hash function (as shown in FIG. 3), the receiving entity would calculate $h_1(h_1(K2))$ to derive the new key, which would be K211, as shown in FIG. 3.

As shown in block 620, the receiving entity may then compare the computed derived key to the certificate derived key. If the keys match, the operation continues to block 622 where the certificate may be indicated as revoked and the receiving entity may disregard the message. Operation may then continue to block 624 and end. For example, if the receiving entity calculated the derived key as being K211, the receiving entity would determine that this matches the certificate's derived key of K211 and as such, determine that Cert5 has been revoked.

At block 620, if the computed derived key and the certificate derived key do not match, operation may continue to block 610. As shown in block 610, the receiving entity may then determine if there are more entries in the CRL that should be compared. If there are additional entries on the CRL, operation continues to block 612 where the next certificate revocation information is retrieved from the CRL. Operation then returns to block 608. If there are no more entries on the CRL, operation continues to block 614.

FIG. 7 illustrates a schematic overview of operations for certificate verification according to some example embodiments of the present invention.

As shown in FIG. 7, an entity, such as entity 702, may send a message 704 to a second entity, such as entity 706. The message 704 may have been generated by entity 702 and include a message signature, $Sig_{SK6}(M)$, generated using the private key 6 of entity 702, the message data M, and Cert6 of entity 702.

Entity 706 may then retrieve the certificate data from Cert6 708 including derived key K212 and index 13 for use in validating the certificate. Entity 706 may have previously received the CRL 710 from the CA comprising entries of {index 5, derived key K12, level 1} and {index 3, derived key K2, level 2}.

Entity 706 may then compute the indexes, as shown at 712, for Cert6 as 6 and 3. Entity 706 may then compare the computed indexes to the entries on CRL 710 and determine that index 3 is on the CRL 710. Entity 706 may then determine the path as being right then left, as shown at 714. Entity 706 may then compute a new derived key using the path and the derived secret value of node 3, K2, as shown at 716. Entity 706 may then compare the computed key of K212 to the derived key of Cert6, K212, and determine that the keys match, as shown at 718. Entity 706 may then determine that Cert6 has been revoked and disregard the message from entity 702.

FIG. 8 illustrates a block diagram of an apparatus that may be configured to perform operations for certificate generation, revocation, or verification according to some example embodiments of the present invention. In example embodiments, an apparatus of FIG. 8 may be configured to perform one or more of the operations of a CA or an entity within a communication network as set forth by FIGS. 1, 2, 4, 5, and 6 above.

As shown in FIG. 8, an apparatus 800 in accordance with one example embodiment may include or otherwise be in communication with one or more of a processor 802, a memory 804, a communication interface 806, and, optionally, a user interface 808.

The processor 802 may be embodied in a number of different ways. For example, the processor may be embodied as one or more of various hardware processing means such as a coprocessor, a microprocessor, a controller, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In some embodiments, the processor (and/or co-processors or any other processing circuitry assisting or otherwise associated with the processor) may be in communication with the memory 804 via a bus for passing information among components of the apparatus. The memory device 804 may include, for example, a non-transitory memory, such as one or more volatile and/or non-volatile memories. In other words, for example, the memory 804 may be an electronic storage device (e.g., a computer readable storage medium) comprising gates configured to store data (e.g., bits) that may be retrievable by a machine (e.g., a computing device like the processor). The memory 804 may be configured to store information, data, content, applications, instructions, or the like for enabling the apparatus to carry out various functions in accordance with an example embodiment of the present invention. For example, the memory 804 could be configured to buffer input data for processing by the processor 802. Additionally or alternatively, the memory 804 could be configured to store instructions for execution by the processor.

In some embodiments, the communication interface 806 may be any means such as a device or circuitry embodied in either hardware or a combination of hardware and software that is configured to receive and/or transmit data from/to a network and/or any other device or module in communication with the apparatus 800.

Optionally, in some embodiments, the apparatus 800 may include a user interface 808 that may, in turn, be in communication with the processor 802 to provide output to a user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms.

As described above, FIGS. 4, 5, and 6 illustrate flowcharts of operations according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions.

Accordingly, blocks of the flowchart support combinations of means for performing the specified functions and combinations of operations for performing the specified. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for certificate revocation with privacy preservation, adapted to a communication within a certificate authority (CA), the method comprising:
   determining that one or more certificates for an entity should be revoked;
   determining a minimum key node set of a key tree that covers the one or more certificates to be revoked;

adding the minimum key node set to a certificate revocation list by at least adding at least a node index and a derived secret key corresponding to the node index to the certificate revocation list, the derived secret key being different from any of the one or more certificates and the node index defining at least one function to apply to the derived secret key to identify the one or more certificates to be revoked; and causing sending of the certificate revocation list to one or more entities.

2. The method of claim 1, wherein determining the minimum key node set comprises determining one or more subtrees of the key tree that have only leaves comprising the certificates to be revoked and adding a root node of each of the one or more subtrees to the minimum key node set.

3. The method of claim 1, wherein adding the minimum key node set to the certificate revocation list comprises adding a tree level for each node within the minimum key node set to the certificate revocation list.

4. The method of claim 1, wherein the certificate revocation list is periodically provided to the entities.

5. The method of claim 1, wherein the certificates comprise a derived secret key from a leaf node of the key tree, an index of the key tree leaf node, a public key for the entity, and a certificate authority signature.

6. The method of claim 1, wherein each of the certificates for the entity has no links to the other certificates for the entity.

7. The method of claim 1, wherein the certificates cannot be used to determine the actual identity of the entity.

8. The method of claim 1 further comprising:
determining a secret value to be used by a certificate authority and the entity;
constructing the key tree based on the secret value, wherein the leaves of the key tree represent derived keys for the certificates for the entity;
generating certificates for the entity based in part on the key tree leaves; and
causing the certificates to be provided to the entity.

9. The method of claim 8, wherein the nodes of the key tree are generated using one-way hash functions and the key value of the parent node.

10. A method for certificate generation with privacy preservation, adapted to a communication within a certificate authority (CA), the method comprising:
determining a secret value to be used by a certificate authority and an entity;
constructing a key tree based on the secret value, wherein the leaves of the key tree represent derived keys for the certificates for the entity; and
generating two or more certificates for the entity based in part on the key tree leaves, each of the two or more certificates for the entity being associated with a different leaf of the key tree leaves; and
causing the two or more certificates to be provided to the entity.

11. The method of claim 10, wherein the certificates comprise a derived secret key from a leaf node of the key tree, an index of the key tree leaf node, a public key for the entity, and a certificate authority signature.

12. The method of claim 10, wherein the nodes of the key tree are generated using one-way hash functions and the key value of the parent node.

13. The method of claim 10, wherein each of the certificates for the entity has no links to the other certificates for the entity.

14. The method of claim 10, wherein the certificates cannot be used to determine the actual identity of the entity.

15. A non-transitory computer-readable storage medium comprising computer program instructions stored therein, the computer program instructions, when executed on a computer, configured to:
determine that one or more certificates for an entity should be revoked;
determine a minimum key node set of a key tree that covers the one or more certificates to be revoked;
add the minimum key node set to a certificate revocation list by at least adding at least a node index and a derived secret key corresponding to the node index to the certificate revocation list, the derived secret key being different from any of the one or more certificates and the node index defining at least one function to apply to the derived secret key to identify the one or more certificates to be revoked; and
provide the certificate revocation list to one or more entities.

16. The computer-readable storage medium of claim 15, wherein the computer program instructions configured to determine a minimum key node set further comprise computer program instructions configured to determine one or more subtrees of the key tree that have only leaves comprising the certificates to be revoked and add a root node of each of the one or more subtrees to the minimum key node set.

17. The computer-readable storage medium of claim 15, wherein the computer program instructions configured to add the minimum key node set to a certificate revocation list further comprise computer program instructions configured to add tree level for each node within the minimum key node set to the certificate revocation list.

18. The computer-readable storage medium of claim 15, wherein the computer program instructions are further configured to cause the certificate revocation list to be periodically provided to the entities.

19. The computer-readable storage medium of claim 15, wherein the certificates comprise a derived secret key from a leaf node of the key tree, an index of the key tree leaf node, a public key for the entity, and a certificate authority signature.

20. The computer-readable storage medium of claim 15, wherein each of the certificates for the entity has no links to the other certificates for the entity.

21. The computer-readable storage medium of claim 15, wherein the certificates cannot be used to determine the actual identity of the entity.

22. The computer-readable storage medium of claim 15, the computer program instructions, when executed on a computer, further configured to:
determine a secret value to be used by a certificate authority and the entity;
construct a key tree based on the secret value, wherein the leaves of the key tree represent derived keys for the certificates for the entity;
generate certificates for the entity based in part on the key tree leaves; and
cause the certificates to be provided to the entity.

23. The computer-readable storage medium of claim 22, wherein the nodes of the key tree are generated using one-way hash functions and the key value of the parent node.

24. A non-transitory computer-readable storage medium comprising computer program instructions stored therein, the computer program instructions, when executed on a computer, configured to:
determine a secret value to be used by a certificate authority and an entity;

construct a key tree based on the secret value, wherein the leaves of the key tree represent derived keys for the certificates for the entity; and generate two or more certificates for the entity based in part on the key tree leaves, each of the two or more certificates for the entity being associated with a different leaf of the key tree leaves; and cause the two or more certificates to be provided to the entity.

25. The computer-readable storage medium of claim 24, wherein the certificates comprise a derived secret key from a leaf node of the key tree, an index of the key tree leaf node, a public key for the entity, and a certificate authority signature.

26. The computer-readable storage medium of claim 24, wherein the nodes of the key tree are generated using one-way hash functions and the key value of the parent node.

27. The computer-readable storage medium of claim 24, wherein each of the certificates for the entity has no links to the other certificates for the entity.

28. The computer-readable storage medium of claim 24, wherein the certificates cannot be used to determine the actual identity of the entity.

29. An apparatus comprising:

at least one processor, and at least one memory including computer program instructions, the memory and computer program instructions being configured to, in cooperation with the processor, cause the apparatus to:

determine that one or more certificates for an entity should be revoked;

determine a minimum key node set of a key tree that covers the one or more certificates to be revoked;

add the minimum key node set to a certificate revocation list by adding at least a node index and a derived secret key corresponding to the node index to the certificate revocation list, the derived secret key being different from any of the one or more certificates and the node index defining at least one function to apply to the derived secret key to identify the one or more certificates to be revoked; and cause sending of the certificate revocation list to one or more entities.

30. The apparatus of claim 29, wherein the memory and computer program instructions being configured to, in cooperation with the processor, cause the apparatus to determine a minimum key node set are further configured to cause the apparatus to determine one or more subtrees of the key tree that have only leaves comprising the certificates to be revoked and add a root node of each of the one or more subtrees to the minimum key node set.

31. The apparatus of claim 29, wherein the memory and computer program instructions being configured to, in cooperation with the processor, cause the apparatus to add the minimum key node set to a certificate revocation list are further configured to cause the apparatus to add a tree level for each node within the minimum key node set to the certificate revocation list.

32. The apparatus of claim 29, wherein the memory and computer program instructions are further configured to, in cooperation with the processor, cause the apparatus to periodically provide the certificate revocation list to the entities.

33. The apparatus of claim 29, wherein the certificates comprise a derived secret key from a leaf node of the key tree, an index of the key tree leaf node, a public key for the entity, and a certificate authority signature.

34. The apparatus of claim 29, wherein each of the certificates for the entity has no links to the other certificates for the entity.

35. The apparatus of claim 29, wherein the certificates cannot be used to determine the actual identity of the entity.

36. The apparatus of claim 29, the memory and computer program instructions further configured to, in cooperation with the processor, cause the apparatus to:

determine a secret value to be used by a certificate authority and the entity;

construct a key tree based on the secret value, wherein the leaves of the key tree represent derived keys for the certificates for the entity;

generate certificates for the entity based in part on the key tree leaves; and cause the certificates to be provided to the entity.

37. The apparatus of claim 36, wherein the nodes of the key tree are generated using one-way hash functions and the key value of the parent node.

38. An apparatus comprising:

at least one processor, and at least one memory including computer program instructions, the memory and computer program instructions being configured to, in cooperation with the processor, cause the apparatus to:

determine a secret value to be used by a certificate authority and an entity;

construct a key tree based on the secret value, wherein the leaves of the key tree represent derived keys for the certificates for the entity; and generate two or more certificates for the entity based in part on the key tree leaves, each of the two or more certificates for the entity being associated with a different leaf of the key tree leaves; and cause the two or more certificates to be provided to the entity.

39. The apparatus of claim 38, wherein the certificates comprise a derived secret key from a leaf node of the key tree, an index of the key tree leaf node, a public key for the entity, and a certificate authority signature.

40. The apparatus of claim 38, wherein the nodes of the key tree are generated using one-way hash functions and the key value of the parent node.

41. The apparatus of claim 38, wherein each of the certificates for the entity has no links to the other certificates for the entity.

42. The apparatus of claim 38, wherein the certificates cannot be used to determine the actual identity of the entity.

* * * * *